J. C. KING.
DETACHABLE COVER FOR PNEUMATIC TIRES.
APPLICATION FILED MAY 18, 1914.
1,119,831.
Patented Dec. 8, 1914.
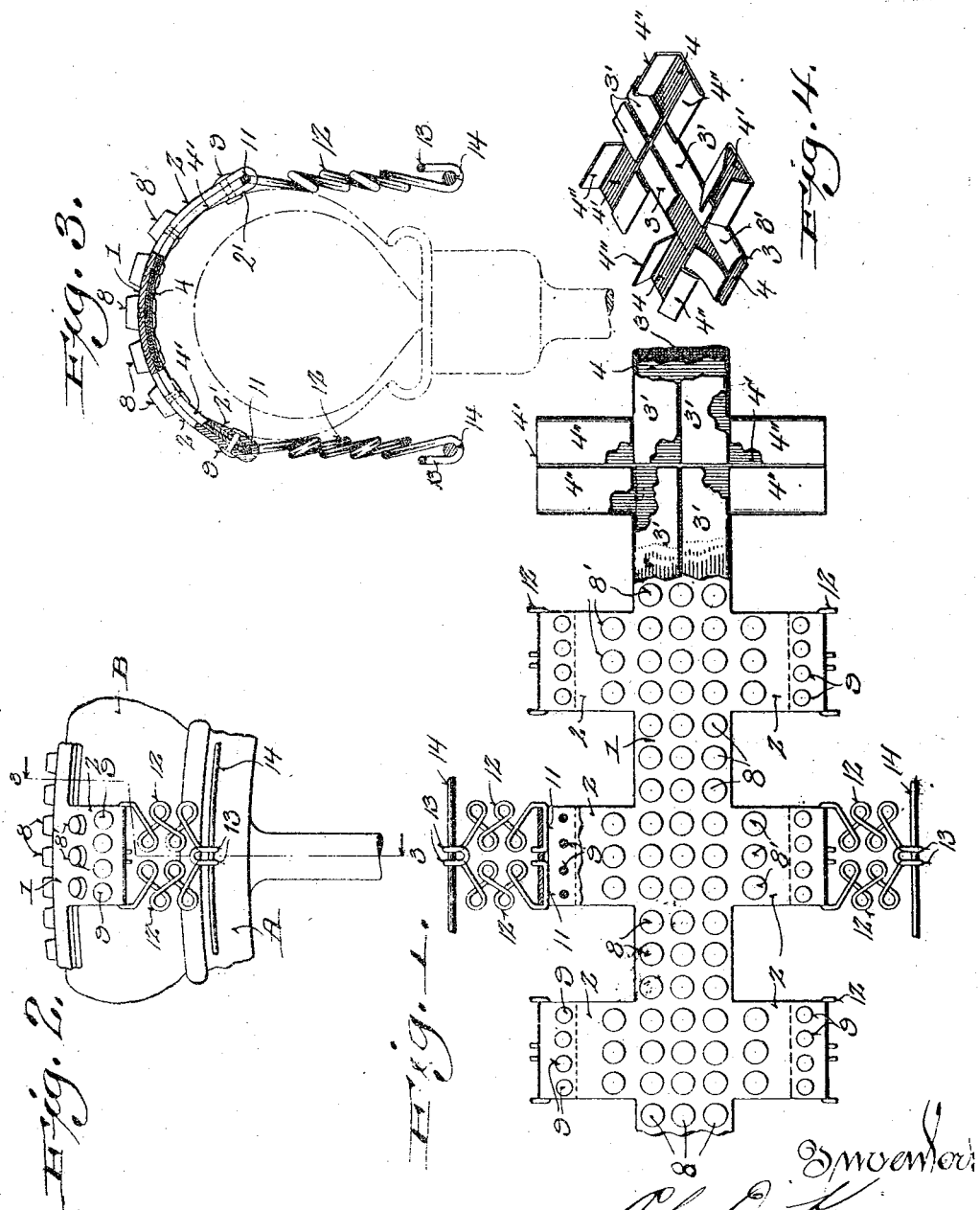

UNITED STATES PATENT OFFICE.

JOHN O. KING, OF MILWAUKEE, WISCONSIN

DETACHABLE COVER FOR PNEUMATIC TIRES.

1,119,831.  Specification of Letters Patent.  Patented Dec. 8, 1914.

Application filed May 18, 1914. Serial No. 839,352.

*To all whom it may concern:*

Be it known that I, JOHN O. KING, a citizen of the United States, and resident of Milwaukee, in the county of Milwaukee and State of Wisconsin, have invented certain new and useful Improvements in Detachable Covers for Pneumatic Tires; and I do hereby declare that the following is a full, clear, and exact description thereof.
My invention refers to detachable tire covers, its object being to provide a simple, economical and effective non-skidding protective cover of the above mentioned type, the same being primarily constructed from leather blanks provided with lateral rectangular tongues at spaced intervals, whereby gripping faces are presented to the spaces between said tongues, which spaces also serve to expose the face of the tire and thus vent and cool the same, the cover being also provided with a series of metallic hobs to further facilitate traction and increase the durability thereof.

Another object of my invention is to provide a spring-clip connection between the cover and a retaining ring, whereby said cover will automatically conform to the contour of the tire coincident to contraction and expansion thereof. Hence by this yielding connection a tension is maintained upon the cover at all times, whereby it will hug the surface of the tire and thus prevent wear due to abrasion, the said cover being in effect a part of the rubber casing.
With the above objects in view the invention consists in certain peculiarities of construction and combination of parts as hereinafter set forth with reference to the accompanying drawings and subsequently claimed.
In the drawings Figure 1 represents a plan view of a portion of a tire cover embodying the features of my invention with parts broken away and other parts in section to more clearly illustrate structural features; Fig. 2, a side elevation of a portion of the same attached to a tire; Fig. 3, an enlarged cross-sectional view of the tire and cover, the section being indicated by line 3—3 of Fig. 2 with a portion of the tongue broken away and in section upon a lower plane, and Fig. 4, a detailed perspective view of a canvas reinforcing strip that conforms to the shape and is fitted to the bottom face of the leather cover, said reinforcing strip being so arranged as to present unbroken edges that are alined with the edges of the interstices between the rectangular tongue members.

Referring by characters to the drawings, 1 represents a tread portion of a tire protector preferably composed of chrome leather, the same being provided with oppositely disposed rectangular tongue extensions 2, which extensions occur at regular intervals. The space between the tongues is preferably equal to the width of the same, whereby the leather blanks may be cut economically from a hide, there being no waste due to the fact that the leather cut from the rectangular spaces of the tongues will form the tongues of a second blank. This leather blank has fitted to its bottom face a canvas tread; reinforcing or stay strip that is composed of an outer and inner layer 3, 4, respectively. The outer layer of the canvas tread strip is formed with longitudinally disposed flaps 3' which fold over the body portion of the inner layer 4 so as to form a binding therefor and also the folded flaps 3 thus form a third layer in their folded positions. The inner canvas layer is formed with laterally extended tabs 4' which are of the same width as the tongue extensions 2 of the cover strip. These tabs are provided with transversely disposed flaps 4'' which are folded down upon the tabs which form a double thickness at this point and also their folded edges present smooth unbroken surfaces whereby wear is avoided. The layers 3 and 4 and their respective folds are thereafter cemented together so as to form a rigid homogeneous stay-strip which is fitted to the cover strip 1 and is secured thereto by rows of metallic hobs 8 having projecting heads which present wearing surfaces that are disposed above the face of the cover, whereby the leather cover is protected against wear and the device is also rendered anti-skidding, it being understood that the hobs or rivets 8 pass through the several layers constituting the cover and are riveted as shown in Fig. 3. The tongues 2 are also provided with a series of these hobs 8' to further increase the efficiency of the cover. The tongues 2 are provided with lapped ends 2', which fold over the exposed face of the tabs 4' as shown, there being rivets 9 for securing the folded ends, which rivets pass through the two thicknesses of the tongue and the interposed tabs. The folded ends of the tongues form loops for the end-bars 11 of spring clips, the end-bars being extended toward each other and terminate with right-angle shanks which project through apertures in the fold. The end-bars of the spring-clips are merged into a series of zig-zag coils 12, the last coils being extended toward each other and terminating with a folded hook end 13. The hook end of each spring-clip is engaged by a retaining ring 14 with which either side of the wheel A is provided, the said retaining rings, in this instance, being formed from wire having its ends connected in any suitable manner.

As best shown in Fig. 2, the completed cover is fitted over the tread of a tire-casing B in the usual manner and the tongues 2, which carry the spring-clips, are folded laterally about the walls of the casing and secured in their folded position by the hook connection between the retaining rings and said spring-clips. In this adjusted position the spring-clips are normally under tension, whereby the cover is drawn tightly to the tread and side walls of the casing at all times irrespective of the rise and fall of said casing due to compression, expansion, or to the fact that said casing is not perfectly inflated through the ordinary pneumatic tube fitted therein. This spring-clip is an essential feature of my invention as in practice it has been found that covers of this type will not adhere to the surface of the casings to which they are attached under all conditions and should a cover be adjusted with sufficient tautness upon a casing under the ordinary conditions for attaching said cover the tension thereof will materially affect the resiliency of the tire; while at the same time after said tire has become deflated for any cause, this cover becomes loose as it is not capable of following the rise and fall of the casing. By employing a yielding connection such as is exemplified by the illustrated clip an expansive and contractile effect is produced upon the cover which at all times will cause the same to hug tightly to the tread. Furthermore I consider the reinforcing or canvas stay-strip another important feature of my invention, as by this construction lateral stretch of the tread portion of the cover is opposed, the canvas serving to hold the leather member against its tendency to contract or expand under weather conditions.

As previously stated the interstices between the tongues are also important features as they, in connection with the edges of the tongues, form transverse gripping surfaces and also this skeleton formation renders it possible to vent the surface of the tire casing, whereby it is kept at a comparatively low temperature not attainable in a solid cover of the same extreme dimensions.

I claim:

A composite tire cover comprising a leather tread strip having oppositely disposed spaced rectangular tongues extending from its tread portion, and a reinforcing strip for the leather tread strips, the reinforcing strip comprising a tread portion having tongues to match the tongues of the leather tread, both the tread portion of the reinforcing strip and its tongue portions being provided with inwardly folded flaps to form a double thickness of canvas having a seamless reinforced edge.

In testimony that I claim the foregoing I have hereunto set my hand at Milwaukee in the county of Milwaukee and State of Wisconsin in the presence of two witnesses.

JOHN O. KING.

Witnesses:
 GEO. W. YOUNG,
 M. E. DOWNEY.